United States Patent

[11] 3,557,868

[72] Inventor Alfred K. Burkell
 Westchester, Ill.
[21] Appl. No. 841,244
[22] Filed July 14, 1969
[45] Patented Jan. 26, 1971
[73] Assignee Graymills Corporation
 Chicago, Ill.
 a corporation of Illinois

[54] HEAT EXCHANGER
 11 Claims, 3 Drawing Figs.
[52] U.S. Cl. .................................................. 165/71,
 165/163; 62/394
[51] Int. Cl. ................................................... F16f 1/34
[50] Field of Search ........................................... 165/71-
 —75, 85, 156, 4, 163; 62/394, 395

[56] References Cited
 UNITED STATES PATENTS
 772,617 10/1904 Jeppeson..................... 165/85
 2,127,732 8/1938 Heitman....................... 165/163X
 2,356,530 8/1944 Pflock.......................... 165/154X
 2,801,831 8/1957 Clarkson...................... 165/156X Primary Examiner—Martin P. Schwadron
Assistant Examiner—Theophil W. Streule
Attorney—Stone, Zummer, Livingston & Aubel ABSTRACT: A heat exchanger for cooling a liquid. The heat exchanger includes a cylindrical outer shell which has a cooling coil in thermal conductive contact with the outer surface of the outer shell. A cylindrical inner shell is mounted within the outer shell with the outer surface of the inner shell being a short distance to the inner surface of the outer shell. A plug is positioned in one end of the outer shell and said plug is spaced from the adjacent end of the inner shell to allow liquid to flow between the end of the inner shell and the plug. An inlet is connected to the other end of the outer shell to allow liquid to flow between the inner and outer shells toward the space between the one end of the inner shell and the plug. An outlet is connected to the other end of the inner shell to carry away liquid from the interior of the inner shell, which liquid has been cooled during its flow between the inner and outer shells.

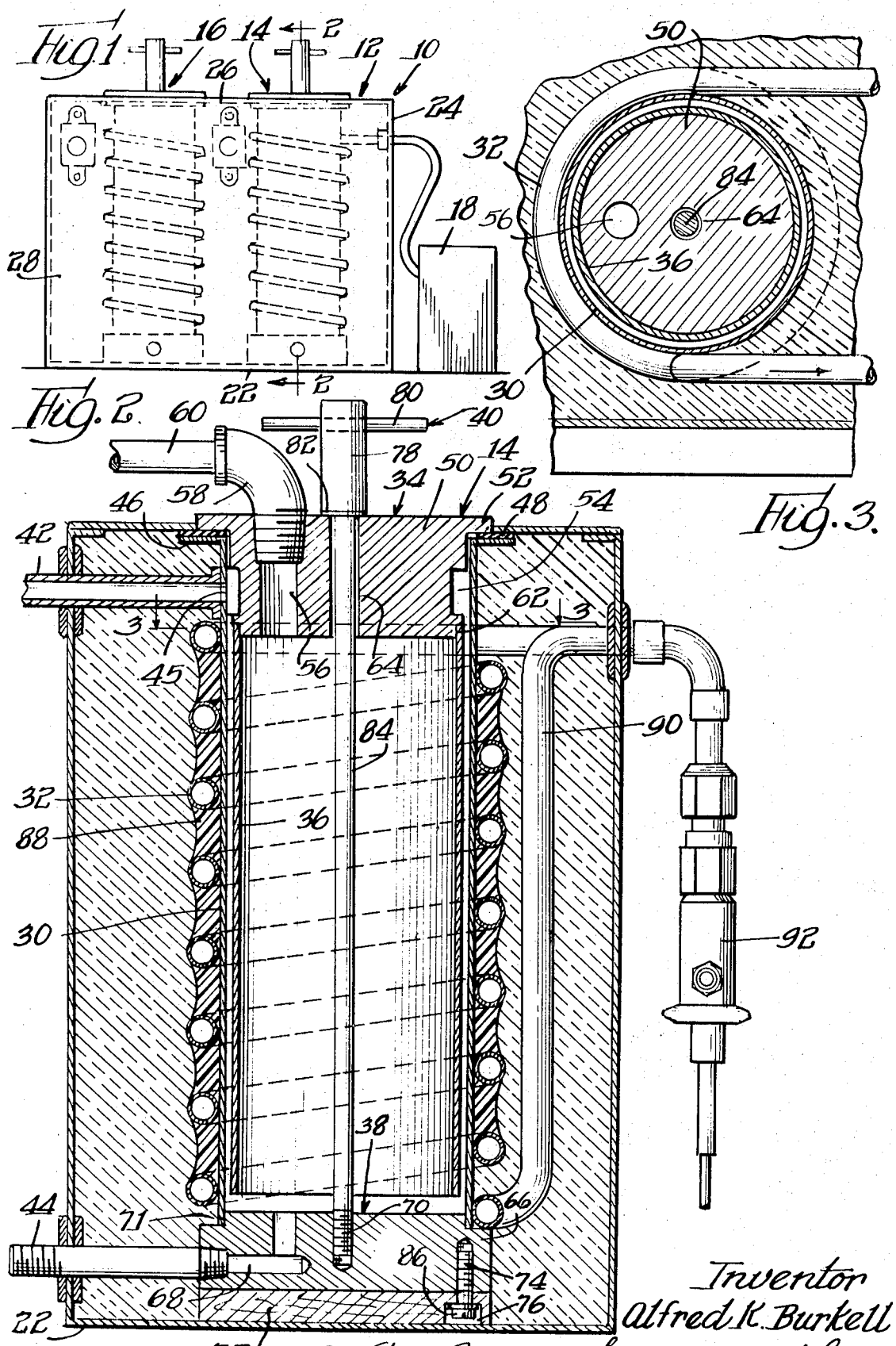

HEAT EXCHANGER

BACKGROUND OF THE INVENTION

In the printing art and especially in lithography, an alcohol-water mixture is applied to certain printing rolls. As is well known, this alcohol-water mixture was originally held in fountains through which certain rolls rotated to pick up the alcohol-water mixture. With the advancement of the lithographic art, it was found that it is desirable to circulate the alcohol-water mixture through the fountains in order to have a uniformity of liquid in each of the fountains. Also, it has been found that it is desirable to maintain the temperature of the alcohol-water mixture at a prescribed temperature to have a uniformity of printing during a given run. It may be appreciated that as the press is operated, heat is generated, and the temperature of the alcohol-water rises as the press heats up, so that the quality of the printing changes during the course of the run. It follows that in order to maintain a given standard of quality and to maintain a given balance of colors from various printing inks, it is necessary to keep uniform the temperature of the liquid applied to the rolls.

Another problem is encountered in lithographic printing is that as the temperature of the alcohol-water mixture rises, an algae in the alcohol-water mixture tends to increase its growth. This algae results in particles being picked up on rolls and results in imperfections being printed on the work.

In order to maintain a constant temperature of the alcohol-water mixture in the printing press, a heat exchanger is utilized to cool the liquid to a desired temperature, such as 70 °F. The heat exchangers which have been used heretofore present a problem in that the algae which grows, irrespective of care and cooling, tends to build up in the heat exchanger and render the heat exchanger inefficient.

SUMMARY OF THE INVENTION

The present invention relates to a heat exchanger for use in connection with a printing press which is particularly adapted for cooling an alcohol-water mixture. The heat exchanger has a high rate of flow adjacent to its cooling surface so that the liquid does not allow any algae to build up on the cooling surface, and thereby impede the efficiency of the cooling of the liquid by forming a thermal barrier between the cooling surface and the liquid. The construction of the heat exchanger is such that it provides a large cooling surface to provide an efficient cooling of the liquid, and at the same time, provides a compact heat exchanger which does not occupy a large amount of space. The construction of the present heat exchanger provides a high rate of flow past the cooling surface with a pump which is relatively small in capacity.

The construction of the present heat exchanger allows ready disassembly of the heat exchanger for cleaning, which cleaning may be done with a minimum of effort and without special tools. The heat exchanger includes a cylindrical outer shell which has a cooling coil in thermal contact with the outer shell to define a thin cylindrical space between the inner shell and the outer shell. A plug is positioned in sealing contact with the outer shell, but space is provided between the end of the inner shell and the plug to allow a liquid entering the space between the inner shell and the outer shell to flow between the two shells to the end of the inner shell adjacent to the plug and then flow up into the inside of the inner shell. An outlet is in communication with the interior of the inner shell to carry away the cooled liquid. The inner shell may be readily removed from within the outer shell so that the interior and exterior of the inner shell and the interior of the outer shell may be quickly and efficiently cleaned with a minimum of effort on the part of a maintenance person.

BRIEF DESCRIPTION OF THE DRAWINGS

FIG. 1 is a side elevation of a cross-sectional view through a case in which two heat heat exchangers embodying the herein disclosed invention are mounted and shown connected to a conventional refrigeration compressor unit;

FIG. 2 is a cross-sectional view taken on line 2–2 of FIG. 1 showing the interior construction of one of the heat exchangers of FIG. 1; and FIG. 3 is a cross-sectional view taken on line 3–3 of FIG. 2.

DESCRIPTION OF THE PREFERRED EMBODIMENT

Referring now to the drawings and especially to FIG. 1, a liquid cooling system is shown therein and is generally indicated by numeral 10. The system generally includes a case 12 which has mounted therein a pair of identical heat exchangers 14 and 16, which heat exchangers are conventionally connected to a conventional refrigeration compressor unit 18.

The case 12 is conventional in its construction in that it includes a floor 22 having four side walls 24 connected thereto and an apertured top 26 connected to the side walls. The heat exchangers 14 and 16 are positioned in the case 12 and are aligned with each of a pair of apertures in the top 26. The remaining space in the case filled with a thermal insulating material 28.

Referring now to FIGS. 2 and 3, a specific construction of the heat exchanger 14 is shown therein. The construction of heat exchanger 16 is identical to the construction of heat exchanger 14. Therefore, the construction of heat exchanger 14 only will be described in detail hereinafter. The heat exchanger 14 generally consists of a thin-wall, cylindrical, thermal-conductive, metallic outer shell 30, a copper cooling coil 32 helically wound around and in thermal contact with the outer surface of outer shell 30, a top plug 34 sealingly connected to the top of the outer shell 30, a thin-wall, cylindrical, thermal-conductive, metallic inner shell 36 mounted on and supported by the top plug, and a bottom plug 38 mounted in the bottom of the outer shell 30. A connecter 40 holds the top plug 34 in sealing engagement with the adjacent end of the outer shell 30. An inlet pipe 42 is connected to the outer shell, and a drain pipe 44 is connected to the interior of the inner shell.

The outer shell 30 is a right circular cylinder and has an inlet aperture 45 communicating with the inlet pipe near its upper end. A seal flange 46 is formed integral with the top end of the outer shell 30 and extends outwardly from the side of the outer shell. Adjacent to the sealed flange 46 is inlet aperture 45, formed in a side of the outer shell. The inlet pipe 42 is fixed to the outer shell in registry with the inlet aperture to allow a liquid to flow into the interior of the outer shell. The seal flange has a gasket 48 mounted in sealing engagement therewith to provide a conventional sealing means between the outer shell and the top plug.

The top plug 34 includes a generally cylindrical body 50 which has a top plug seal flange 52 formed integral therewith. The flange 52 sealingly engages the gasket 48. The body has an annular inlet groove 54 formed therein, which inlet groove communicates with the inlet pipe 42 so that a liquid may be distributed about the end of the outer shell. An outlet port 56 is formed in body 50, and an outer fitting 58 is threadedly mounted in the outlet port 56. The fitting 58 is connected to a pipe 60 which returns the liquid to a liquid-circulatory system. The plug 50 includes an annular recess 62 in which is fixedly and sealingly mounted one end of the inner shell 36. The plug 34 has a connector aperture 64 extending axially through the center of the body 50 to receive a portion of the connector 40.

The bottom plug 38 includes a cylindrical body 66. The plug body 66 has formed therein a drain port 68 which is connected to the drain pipe 44. The drain pipe is connected to an outlet valve which is not shown herein. The body 66 also has an axial threaded aperture 70 which is aligned with connector aperture 64 and also receives the connector 40. Sealingly connected to the plug 38 at an annular recess 71 is the outer shell.

Mounted below the bottom plug 38 and in engagement therewith is a wooden bottom plate 72, which plate contains a pair of axial apertures 74 and communicating screw recesses 76. The bottom plate rests on floor 22 of the case.

The connector 40 includes a head 78 which has a handle 80 fixed therein. A washer 82 is mounted in engagement with the head 78 and with the top plug 34 to provide a seal around aperture 64. A rod 84 is fixed to head 78 and extends through the washer 82, through the aperture 64, and screws into threaded aperture 70. The end of rod 84 is externally threaded. A pair of screws 86 are positioned in their respective axial apertures 74 and screws recesses 76 and secure the body 66 to the bottom plate 72.

The cooling oil 32 is helically wound around the outer surface of the outer shell 30 and is in thermal contact with the outer surface of the outer shell. A thermal mastic 88 holds the cooling coil in position. The cooling coil is connected to a refrigerant pipe 90, which in turn is connected to expansion valve 92, which expansion valve is conventionally connected to the conventional refrigeration unit 18.

As is conventional, the refrigeration unit provides a compressed refrigerant to the expansion valve 92, and the expansion of the refrigerant causes the refrigerant to cool. The cold refrigerant is circulated through the cooling coil 32, thereby cooling the cooling coil. The cooling of the cooling coil also cools the outer shell.

When the present heat exchanger is connected to a conventional printing press, a pump, which is not shown, delivers an alcohol-water mixture to the inlet pipe 42. The alcohol-water mixture flows through the inlet aperture 45 and into the inlet groove 54. The alcohol-water mixture then circulates around the top plug 34 in the inlet groove 54, and the alcohol-water mixture then flows downward between the outer surface of the inner shell 36 and the inner surface of the outer shell 30. In a specific construction, it is found that a space of approximately one-sixteenth of an inch is desirable for the distance between the inner surface of the outer shell and the outer surface of the inner shell so that there is a thin layer of flow of liquid adjacent to the cooling surface of the outer shell. The liquid flows downward toward the bottom plug 38. It should be noted that there is a high rate of flow adjacent to a large cooling surface so that there is an efficient cooling of the liquid. The high rate of flow serves to prevent any buildup of algae which may tend to occur on the cooling surface of the outer shell, which algae could act as an insulator between the liquid and the cooling surface. The liquid flows downward until it reaches the bottom portion of the inner shell 36 and then flows between the end of the inner shell 36 and the plug 38. The liquid then reverses direction and flows upward inside the inner shell 36 and to the outlet port 56. The liquid then flow through fitting 58 into pipe 60, from whence it s carried to the circulating system.

The present heat exchanger provides an efficient cooling system for the alcohol-water mixture. A further advantage to the system is that the heat exchanger may be conveniently and readily cleaned. In order to clean the heat exchanger 14, it is necessary only to interrupt the flow of liquid to the heat exchanger and then drain the liquid within the heat exchanger through the drain port 68 into drain pipe 44. Once the liquid is drained, the handle 80 is rotated to disengage the rod 84 from the plug 38. The plug 34 is then lifted, which also lifts out the connector 40 and the inner shell 36. With the inner shell and the upper plug removed, it may be appreciated that the outer shell may be quickly and conventionally wiped out to remove any algae may have built up within the heat exchanger. Also, the interior and exterior of the inner shell may be quickly and conveniently wiped out to remove any algae. In order to reassemble the heat exchanger, it is necessary only to drop the top plug 34 back into position so that the flange 52 sealingly engages the gasket 48. The threaded end of rod 84 is placed into engagement with threaded aperture 70, and the handle is rotated until the rod is drawn up tight against the top plug, thereby creating a seal between the plug and the gasket 48. The heat exchanger is ready for use after the drain pipe is closed.

From the foregoing description, it is readily apparent that the instant heat exchanger provides an efficient means for cooling an alcohol-water mixture in a thin layer of flow, so that the alcohol-water mixture is cooled efficiently but the rate of flow of mixture is great along the cooling surface so that there is little or no opportunity for algae to form on the cooling surface, which algae would act as an insulator and thereby reduce the efficiency of cooling. The sidewalls of the heat exchanger, and in particular the cooling coil, are surrounded by a thermal insulator so that the cooling coil is thermally insulated from the side walls of the case 12. Thereby, there is a minimum loss of cooling effect to the side walls of the case. This renders the overall operation of the unit to be efficient, and there is no appreciable cooling of the side walls so that moisture does not condense on the outside walls of the case.

Although specific terms such as "downward," "upward," "top," and bottom" have been used in the description of the preferred embodiment, it is readily apparent that those skilled in the art may orient the positions of the various parts in a different manner. The use of these terms is solely for purposes of illustration, in compliance with the requirements of the Patent Act of 1952, and these terms and the specific description of the present invention are in no way intended to limit the scope of the present invention.

I claim:

1. A heat exchanger for cooling a liquid used in printing comprising, in combination, a metallic heat-conductive thin-walled cylindrical outer shell, a helical cooling coil mounted in thermal contact with the outer surface of the outer shell, a top lug removably sealingly mounted in one end of said outer shell, said top plug having a circumferential inlet groove and an outlet port extending therethrough, a bottom plug sealingly engageable with the other end of the outer shell, a cylindrical inner shell having one end sealingly fixed to the top plug, said inner shell having its outer surface a short distance from the inner surface of the outer shell, said inner shell having its other end adjacent to but spaced from the bottom plug to allow a liquid to flow between the other end of the inner shell and the bottom plug, whereby liquid delivered to the inlet groove flows between the outer and inner shells to the space between the end of the inner shell and the bottom plug and the direction of flow of liquid is reversed to flow out of the outlet port in the top plug.

2. A heat exchanger for cooling a liquid as defined in claim 1 wherein the distance between the outer surface of the inner shell and the inner surface of the outer shell is approximately one-sixteenth of an inch.

3. A heat exchanger for cooling a liquid as defined in claim 1 wherein the bottom plug includes an outlet port for draining liquid from the outer shell.

4. A heat exchanger as defined in claim 1 including a rod extending through the top plug and being connected to the bottom plug for holding the top plug in position and sealingly connected to the outer shell.

5. A heat exchanger as defined in claim 1 wherein the bottom plug has formed therein an outlet port for draining liquid from the outer shell, and including a rod extending through the top plug and being connected to the bottom plug for holding the top plug in position and in sealing engagement with the outer shell.

6. A heat exchanger for affecting the temperature of a liquid comprising, in combination: an outer shell; means for conducting heat connected to the outer surface of the outer shell; an inner shell mounted within the outer shell and the outer surface of the inner shell being spaced a short distance from the inner surface of the outer shell; an inlet for providing liquid to the heat exchanger positioned adjacent to one end of the outer shell; an outlet positioned adjacent to the same end of the outer shell, whereby liquid flowing from the inlet flows between the inner and outer shells to the end of the inner shell and then reverses flow to flow out from the interior of the inner shell through the outlet.

7. A heat exchanger as defined in claim 6 including a top plug sealingly connected to the outer shell and having the inner shell supported on the top plug.

8. A heat exchanger as defined in claim 7 including a bottom plug sealingly connected to the other end of the outer shell and being spaced from the adjacent end of the inner shell to allow liquid to flow between the adjacent end of the inner shell and the bottom plug.

9. A heat exchanger as defined in claim 8 including a rod extending through the top plug and being connected to the bottom plug for holding the top plug in position and sealingly connected to the outer shell.

10. A heat exchanger as defined claim 7 wherein the top plug includes an annular inlet groove communicating with the inlet to distribute liquid about the one end of the outer shell.

11. A heat exchanger as defined in claim 6 wherein the means for conducting heat is a helical copper coil mounted on and in thermal contact with the outer surface of the outer shell.

PO-1050
(5/69)

UNITED STATES PATENT OFFICE
CERTIFICATE OF CORRECTION

Patent No. 3,557,868          Dated January 26, 1971

Inventor(s) Alfred K. Burkell

It is certified that error appears in the above-identified patent and that said Letters Patent are hereby corrected as shown below:

Col. 1, line 22, insert --which-- after "problem";

line 56, after "shell" first occurrence, insert --. An inner shell is positioned within the outer shell---.

Col. 4, line 29, "lug" should be --plug--.

Signed and sealed this 20th day of April 1971.

(SEAL)
Attest:

EDWARD M. FLETCHER, JR.       WILLIAM E. SCHUYLER, JR.
Attesting Officer      Commissioner of Patents